(12) United States Patent
Chang et al.

(10) Patent No.: US 12,121,869 B2
(45) Date of Patent: Oct. 22, 2024

(54) POROUS POLYTETRAFLUOROETHYLENE MEMBRANE, AND THERMOSETTING METHOD

(71) Applicant: Allied Supreme Corp., Taipei (TW)

(72) Inventors: Chih-Cheng Chang, Xianxi Township (TW); Kuo-Cheng Chen, Xianxi Township (TW)

(73) Assignee: Allied Supreme Corp., Taipei (TW)

( * ) Notice: Subject to any disclaimer, the term of this patent is extended or adjusted under 35 U.S.C. 154(b) by 293 days.

(21) Appl. No.: 17/577,586

(22) Filed: Jan. 18, 2022

(65) Prior Publication Data
US 2022/0250011 A1 Aug. 11, 2022

(30) Foreign Application Priority Data

Feb. 9, 2021 (TW) ................................. 110105169

(51) Int. Cl.
*B01D 71/36* (2006.01)
*B01D 67/00* (2006.01)

(52) U.S. Cl.
CPC ......... *B01D 71/36* (2013.01); *B01D 67/0023* (2013.01); *B01D 2323/08* (2013.01); *B01D 2323/34* (2013.01); *B01D 2323/42* (2013.01); *B01D 2323/50* (2013.01); *B01D 2325/02* (2013.01); *B01D 2325/04* (2013.01)

(58) Field of Classification Search
CPC ......... B01D 71/36; B01D 67/0023; C08J 9/36
See application file for complete search history.

(56) References Cited

U.S. PATENT DOCUMENTS 6,103,172 A * 8/2000 Newman ............ B01D 67/0027
210/500.36

FOREIGN PATENT DOCUMENTS

| CN | 1504498 A | | 6/2004 |
|---|---|---|---|
| CN | 111151149 A | | 5/2020 |
| CN | 212457825 | * | 2/2021 |
| JP | H10287759 A | | 10/1998 |
| JP | 2003128831 | * | 5/2003 |
| JP | 2003176374 | * | 6/2003 |
| JP | 2004142106 | * | 5/2004 |
| JP | 2004231756 | * | 8/2004 |
| JP | 3672868 | * | 7/2005 |
| JP | 2006143962 | * | 6/2006 |
| TW | 201538316 A | | 10/2015 |
| TW | M605443 U | | 12/2020 |

* cited by examiner

Primary Examiner — Edmund H Lee
(74) Attorney, Agent, or Firm — Best & Flanagan LLP

(57) ABSTRACT

The present invention provides a thermosetting method to form a porous polytetrafluoroethylene membrane, wherein a heat flow in a heat circulating environment is provided to ensure the porous polytetrafluoroethylene membrane is heated uniformly. A thermal heating radiation plat is further used that being heated by the heat flow to generate a far-infrared radiation for providing an enhanced heating effect without extra energy consuming sources. The thermosetting method of porous polytetrafluoroethylene membrane not only maintain a uniformity temperature inside the heating compartment, stabilize the quality of the polytetrafluoroethylene porous membrane, but also make the thermosetting process more efficiently without using extra energy input.

8 Claims, 3 Drawing Sheets

POROUS POLYTETRAFLUOROETHYLENE MEMBRANE, AND THERMOSETTING METHOD

FIELD OF INVENTION

A process method and equipment of a membrane, especially a porous polytetrafluoroethylene membrane, thermosetting method, and equipment thereof.

BACKGROUND OF THE INVENTION

Fluoropolymer is well known material with high performance properties like non-sticking, chemical resistance, heat resistance, excellent surface smoothness with low friction coefficient, and UV resistance. Thus, fluoropolymer is widely used for variant industries like semiconductor field, medical parts, even daily merchandise such as non-stick pan or the like kitchenware.

Except for aforementioned properties, polytetrafluoroethylene (PTFE), a family member of the fluoropolymer, can be produced as a polytetrafluoroethylene membrane with multiple mini-pores formed thereon being widely used as a filter in chemical industry.

The prior PTFE membrane is formed by stretching process to produce the membrane with mini-pores. However, existed PTFE membrane has some serious disadvantages like non-uniform pore sizes, waving surface. Thus, to produce a PTFE membrane with high thickness uniformity and uniform pore sizes is one of the key issues need to be solved.

SUMMARY OF THE INVENTION

To overcome the aforementioned shortcomings of the prior PTFE film, the present invention provides a thermosetting process to form a high quality porous polytetrafluoroethylene membrane.

The present invention provides a thermosetting method of producing a porous polytetrafluoroethylene membrane comprises steps of: 1) preparing a porous polytetrafluoroethylene membrane in a heat circulating environment; 2) providing the porous polytetrafluoroethylene membrane a heat flow with Celsius temperature between 250-400 degrees to thermal setting the porous polytetrafluoroethylene membrane; and 3) continuously providing a far-infrared radiation heating enhancement energy source to the porous polytetrafluoroethylene membrane in accordance with the heat flow, wherein the far-infrared radiation heating enhancement energy source is emitted by a far-infrared material being placed in the heat circulating environment to induce far-infrared radiation by the heat flow.

Wherein, the speed of the heat flow is controlled in 0.6~1.2 meters per minute, a shrinkage rate of the porous polytetrafluoroethylene membrane is reduced to 3% or less.

Wherein, the heat flow is perpendicular or parallel to one side of the porous polytetrafluoroethylene membrane.

Wherein, the process of preparing the porous polytetrafluoroethylene membrane further comprises step of: preparing a polytetrafluoroethylene mixture, wherein a size screened polytetrafluoroethylene powder is used to mix with a lubricant and form the mixture as polytetrafluoroethylene beads; using the polytetrafluoroethylene beads to extrude the polytetrafluoroethylene mixture as a sheet with extruding pressure 23~30 megapascal (MPa) under Celsius temperature 40~70 degrees; forming the sheet to a slice with thickness between 0.1~0.6 millimeter, and remove the lubricant in the mixture under Celsius temperature between 150-250 degrees; and using a biaxial stretching process to extend the slice under Celsius temperature between 200-300 degrees, where the slice becomes the porous polytetrafluoroethylene membrane with thickness between 10~80 micrometers.

Wherein, the porous polytetrafluoroethylene membrane has a porosity of the pores between 70%~90%, a pore size ranging from 100~450 nanometers (nm), and a thickness of the porous polytetrafluoroethylene membrane between 10~80 micrometers (μm).

The present invention also provides an equipment of producing a porous polytetrafluoroethylene membrane comprising an oven and a circulating device, wherein the oven defines a heat circulating environment, the circulating device provides a heat flow toward a circulating path in the heat circulating environment; and a thermal radiation plate which is heated by the heat flow and generates a far-infrared radiation with wavelength ranging from 4~9 micrometers (μm) is placed in the oven.

Wherein, the far-infrared material is selected from the group consisting of magnesium oxide, calcium oxide, barium oxide, zirconium dioxide, titanium dioxide, manganese dioxide, chromium sesquioxide(chromium(III) oxide), iron sesquioxide(iron(III) oxide), alumina, chromium carbide, titanium carbide, tantalum carbide, molybdenum carbide, tungsten carbide, boron carbide, silicon carbide, titanium silicide, monotungsten disilicide, molybdenum disilicide, zirconium boride, titanium boride, chromic boride, zirconium nitride, titanium nitride, zirconium nitride, boron nitride, aluminum nitride and silicon nitride.

Wherein, the far-infrared material is an oxidation layer that using anodize coating process.

The present invention also provides a porous polytetrafluoroethylene membrane which is made from thermosetting method comprising: provide the porous polytetrafluoroethylene membrane a heat flow with Celsius temperature between 250-400 degrees in a heat circulating environment, the speed of the heat flow is controlled in 0.6~1.2 meters per minute, and the far-infrared radiation, induced by the heat flow in the heat circulating environment, forms a secondary heating enhancement.

The present invention which combine the technology of the heat flow and the thermal radiation heating enhancement energy source that can sure every single portion of the porous polytetrafluoroethylene membrane may be received a same heating temperature that stabilizing the boundary temperature of porous polytetrafluoroethylene membrane, reducing the shrinkage rate of the porous polytetrafluoroethylene membrane to 3% or less, and controlling the quality of the porous polytetrafluoroethylene membrane after the thermal setting effectively.

DETAILED DESCRIPTION OF THE PREFERRED EMBODIMENTS

In order to make purposes, technical solutions, and advantages of the present invention to be clearer, the following content provides some preferred embodiments in accordance with the present invention.

Figure 1:
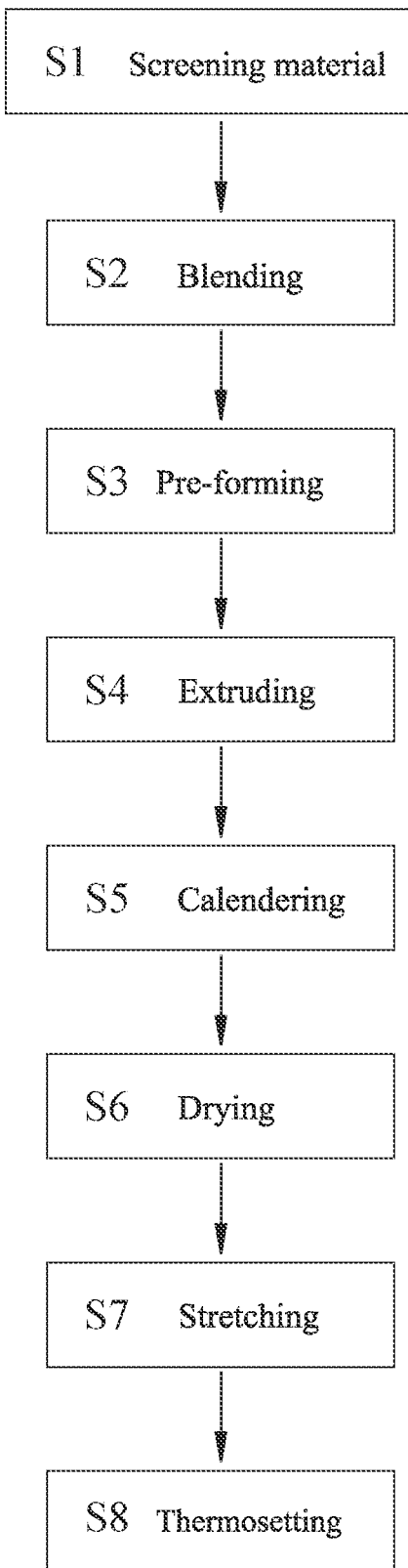
FIG. 1 is a block diagram of at least one embodiment a method of producing porous polytetrafluoroethylene membrane.

With reference to FIG. 1, a preferred embodiment of method of producing porous polytetrafluoroethylene membrane in accordance of the present invention has steps comprising of:

S1. Screening material: Using a sieve to screen a polytetrafluoroethylene powder. In some embodiments, the mesh of the sieve is between 7~10 meshes.

S2. Blending: forming a polytetrafluoroethylene mixture by mixing a screened polytetrafluoroethylene powder with a lubricant, wherein the weight percentage of the lubricant is between 16~22 wt %. In some embodiments, the lubricant can be selected from an isoparaffinic solvent without aromatic hydrocarbon which is low toxicity, less bad smell, harmless to health and is environmental-friendly.

S3. Pre-forming: Providing a condition under Celsius temperature 25~30 degrees and a pressure 1~3 megapascals (MPa) to form the polytetrafluoroethylene mixture as polytetrafluoroethylene beads.

S4. Extruding: Extruding the polytetrafluoroethylene beads as a sheet with a thickness between 0.7~1.3 millimeter under pressure 23~30 megapascals (MPa) and Celsius temperature 40~70 degrees.

S5. Calendering: Forming the sheet to a slice with thickness between 0.1~6 millimeter.

S6. Drying: Removing the lubricant in the slice under Celsius temperature between 150-250 degrees.

S7. Stretching: Using a biaxial stretching process to extend the slice along the longitudinal and transverse directions under Celsius temperature between 200-300 degrees. Thus, the slice becomes a porous polytetrafluoroethylene membrane with thickness between 10~80 micrometers. In the preferred embodiment, stretch speeds along the longitudinal and transverse directions can be in the range of 5~30 meters per minute respectively.

S8. Thermosetting. Placing the porous polytetrafluoroethylene membrane in an oven which defines a heat circulating environment therein. The heat circulating environment provides the porous polytetrafluoroethylene membrane continuously a heat flow with Celsius temperature between 250-400 degrees and a far-infrared radiation heating enhancement energy source to thermal setting the membrane. Wherein the far-infrared radiation heating enhancement energy source is formed accordance with the heat flow in the heat circulating environment to generate a secondary heating effect and make the thermosetting process more efficiently. The far-infrared radiation heating enhancement energy source can release a far-infrared radiation with wavelength ranging from 4~9 micrometers (μm), which is the best wavelength rang absorbed for polytetrafluoroethylene material, and can affect to the inside of the porous polytetrafluoroethylene membrane directly.

In one of the preferred embodiment of the present invention, a porosity of the porous polytetrafluoroethylene membrane is tested under ASTM D4895 and ASTM D792, where following steps are adopted in these test standards. Step 1) Dip the porous polytetrafluoroethylene membrane in a solution 0.1 wt % Triton X-100. Step 2) Measure a membrane density(d) of the porous polytetrafluoroethylene. Said density is compared from its buoyancy. Step 3) Convert the porosity of the porous polytetrafluoroethylene membrane according to following formula:

Porosity=(1−(d/D))*100 where, D is the density of a non-pore PTFE; d is the membrane density.

Due to a shrinkage rate of the porous polytetrafluoroethylene membrane can be reduced to 3% or less by the thermal setting process, a porosity of the pores formed on the porous polytetrafluoroethylene membrane is 70%~90%

According to the Table 1 and Table 2, a thermosetting uniformity of the porous polytetrafluoroethylene membranes is evaluated by measuring a degree of sintering in the two statements of enthalpy (1st ΔH and 2nd ΔH) on a plurality part of the porous polytetrafluoroethylene membrane. Wherein, numbered membrane 1-1~1-8 in the table 1 are a fragment of each part in a porous polytetrafluoroethylene membrane which is received the thermosetting process by the heat flow only, and numbered membrane 2-1~2-8 in the table 2 are a fragment of each part in a porous polytetrafluoroethylene membranes received the thermosetting process combined the heat flow and the far-infrared radiation.

The method to analyze the degree of sintering is converted two statements of enthalpy (1st ΔH and 2nd ΔH) of each fragment (membrane 1-1~1-8 and membrane 2-1~2-8) respectively with the enthalpy of a raw material (raw 1st ΔH=44.2141 J/g) without thermosetting by the following formula.

$$DSC(\%) = \frac{(\text{raw } 1st\ \Delta H) - (\text{membrane } 1st\ \Delta H)}{(\text{raw } 1st\ \Delta H) - (\text{membrane } 2nd\ \Delta H)}$$

Comparing to the Table 1 and Table 2, the overall of the degree of sintering of membrane 2-1 to membrane 2-8 present the better and stable results than the membrane 1-1 to membrane 1-8, and the difference range of the degree of sintering in each part of the porous polytetrafluoroethylene membranes (membrane 2-1~2-8) is between ±5%. Thus, it can be clearly evaluated that the porous polytetrafluoroethylene membranes which are received the thermosetting process combined the heat flow and the far-infrared radiation show the better thermosetting uniformity than the porous polytetrafluoroethylene membranes only heated by the heat flow.

TABLE 1

The porous polytetrafluoroethylene membrane (membrane 1-1 ~ 1-8) only heated by the heat flow in the thermosetting process.

| Membrane | 1st ΔH (J/g) | 2nd ΔH (J/g) | Degree of sintering |
|---|---|---|---|
| 1-1 | 23.5007 | 15.0683 | 71.07% |
| 1-2 | 21.1240 | 12.4609 | 72.72% |
| 1-3 | 18.4824 | 14.6150 | 86.93% |
| 1-4 | 16.9164 | 13.6984 | 89.45% |
| 1-5 | 23.7916 | 13.2293 | 65.91% |
| 1-6 | 19.2535 | 16.8945 | 91.37% |
| 1-7 | 22.6206 | 16.3057 | 77.37% |
| 1-8 | 17.5215 | 13.0125 | 85.55% |

TABLE 2

The porous polytetrafluoroethylene membrane (membrane 2-1 ~ 2-8) heated by the heat flow and the far-infrared radiation in the thermosetting process.

| Membrane | 1st ΔH (J/g) | 2nd ΔH (J/g) | Degree of sintering |
|---|---|---|---|
| 2-1 | 20.9429 | 327.38 | 85.48% |
| 2-2 | 19.2789 | 326.06 | 82.00% |
| 2-3 | 18.1676 | 327.03 | 87.07% |
| 2-4 | 18.5838 | 326.93 | 84.05% |
| 2-5 | 19.0547 | 327.96 | 90.38% |

TABLE 2-continued

The porous polytetrafluoroethylene membrane (membrane 2-1 ~ 2-8) heated by the heat flow and the far-infrared radiation in the thermosetting process.

| Membrane | 1st ΔH (J/g) | 2nd ΔH (J/g) | Degree of sintering |
| --- | --- | --- | --- |
| 2-6 | 18.7555 | 326.66 | 88.21% |
| 2-7 | 18.5121 | 327.46 | 82.86% |
| 2-8 | 18.2571 | 328.30 | 83.55% |

Pore size of the porous polytetrafluoroethylene membrane is tested under ASTM F316. In this method, a liquid comprising the poly (perfluoropropylene oxide-co-perfluoroformaldehyde) is used to fill in each pore on the porous polytetrafluoroethylene membrane, and then presses the liquid through each pore to record a pressure value for the liquid through the hole. The said pressure value is detected by a pressure transducer which is generally increased with an increasing gas flow rate. Thus, pore size of the porous polytetrafluoroethylene membrane may be converted by the following equation:

$$d = C\gamma/p;$$

where:
d is limiting diameter, μm,
γ is surface tension, mN/m, (dynes/cm),
p is pressure, Pa or cm Hg, and
C is constant, 2860 when p is in Pa, 2.15 when p is in cm Hg, and 0.415 when p is in psi units.

In this preferred embodiment of the present invention, sizes of the pores are ranging from 100 to 450 nanometers (nm), the thickness of the porous polytetrafluoroethylene membrane is 10~80 micrometers (μm).

The said oven comprises a circulating device providing the heat flow in the heat circulating environment, and the speed of the heat flow is controlled in 0.6~1.2 meters per minute. Directions of the heat flow may be perpendicular or parallel to the porous polytetrafluoroethylene membrane. Said perpendicular heat flow provides a faster thermosetting result to the porous polytetrafluoroethylene membrane.

In the general thermosetting process, the porous polytetrafluoroethylene membrane was mainly heated only by a convective heat flow But the convective heat flow cannot exhibit a concentrated heating temperature applied on the surface of the porous membrane, that the heating temperature cannot be quickly adjusted to the expected range, which not only makes a low production efficiency, also makes a uniform thermosetting area on the surface of the porous membrane.

The far-infrared radiation heating enhancement energy source is generated from a thermal radiation plate being placed in the oven. The said thermal radiation plate is heated by the heat flow and releases the far-infrared radiation to provides the secondary (enhanced) heating effect. Thus, the thermal radiation plate may reduce the process time without using extra energy input to save energy. Furthermore, the efficiency and stability of the thermosetting performance is dramatically increased.

The thermal radiation plate may be a far-infrared material coated metallic plate. Material of the metallic plate may be a stainless steel or aluminum alloy plate. The far-infrared material is selected from ceramics being able to generate the far-infrared radiation with wavelength ranging from 4~9 micrometers (μm). The far-infrared material can be a mixture spread on a surface of the metallic plate or an oxidation layer that using anodize coating process.

The mixture of the far-infrared material is selected from the group consisting of magnesium oxide, calcium oxide, barium oxide, zirconium dioxide, titanium dioxide, manganese dioxide, chromium sesquioxide(chromium(III) oxide), iron sesquioxide(iron(III) oxide), alumina, chromium carbide, titanium carbide, tantalum carbide, molybdenum carbide, tungsten carbide, boron carbide, silicon carbide, titanium silicide, monotungsten disilicide, molybdenum disilicide, zirconium boride, titanium boride, chromic boride, zirconium nitride, titanium nitride, zirconium nitride, boron nitride, aluminum nitride and silicon nitride.

However other general radiant heaters, such as quartz halogen lamps and stainless-steel electric heating tubes, cannot reach the radiation wavelength between 4~9 micrometers (μm). Thus, even if the porous polytetrafluoroethylene membrane is heated by quartz halogen lamps or stainless-steel electric heating tubes for a long time, the thermosetting result of the porous polytetrafluoroethylene membrane is not only inefficient, but also incomplete.

If only use a radiant heater to generate the radiation wavelength between 4~9 micrometers (μm) directly to the porous polytetrafluoroethylene membrane, it will be difficult to control the temperature on the surface of the porous polytetrafluoroethylene membrane because the preferred heat absorption efficiency, and resulting in uneven thermosetting.

Therefore, the present invention provides the thermosetting method combined the technology of the heat flow and the far-infrared radiation can make the porous polytetrafluoroethylene membrane receive a same heating temperature at every single portion, stabilize the quality of the porous polytetrafluoroethylene membrane and even maintain a grate thermosetting efficiency.

In this preferred embodiment of the present invention, a differential scanning calorimetry (DSC) according to ASTM D4591 standard is used to exam thermo-properties of the porous polytetrafluoroethylene membrane. In this test standard, a heating or cooling process is adopted to the porous polytetrafluoroethylene membrane to detect changes of thermo-properties. The following steps are used in this test procedure: 1) heating the porous polytetrafluoroethylene membrane to Celsius temperature 390° C. with a heating rate 10° C. per minute; 2) maintaining the porous polytetrafluoroethylene membrane at Celsius temperature 390° C. with 5 minute; 3) cooling down the porous polytetrafluoroethylene membrane to Celsius temperature 150° C. with a rate of 10° C. per minute; 4) heating the porous polytetrafluoroethylene membrane to Celsius temperature 390° C. again with the heating rate at 10° C. per minute.

Figure 2:
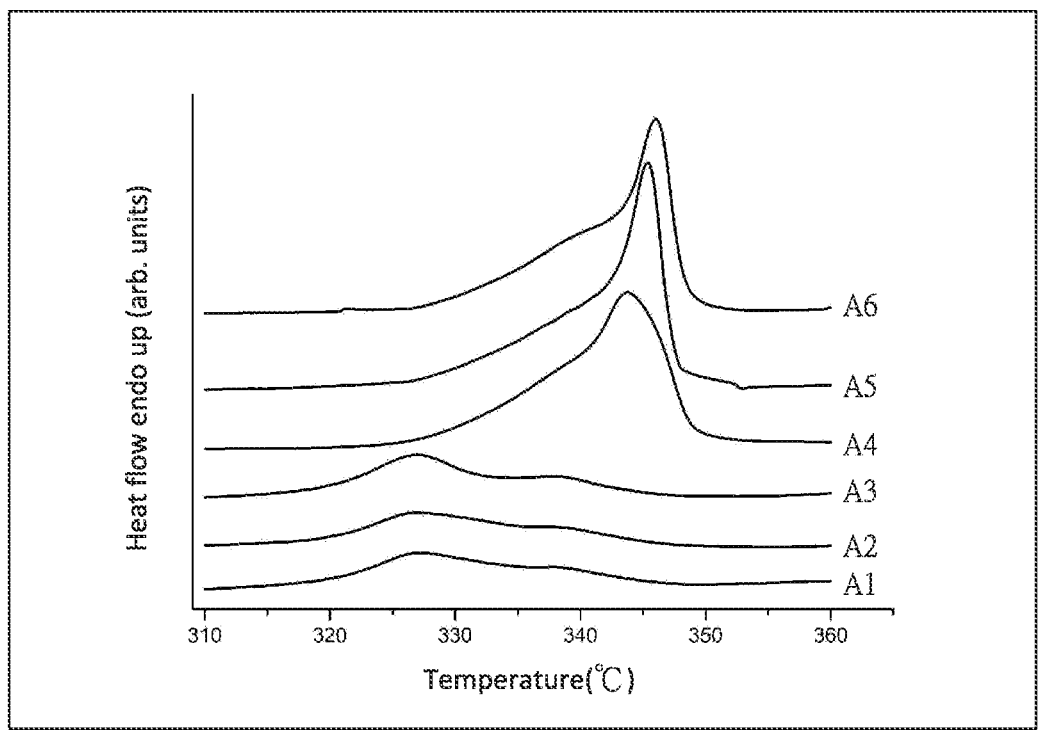
FIG. 2 is a comparison diagram of at least one embodiment with the porous polytetrafluoroethylene membrane.

FIG. 2 reveals a comparison diagram with the porous polytetrafluoroethylene membranes with sample number A1~A3 formed by the thermal setting process provided by the present invention and the porous polytetrafluoroethylene membranes with sample number A4~A6 without the thermal setting process being tested by the differential scanning calorimetry. The porous polytetrafluoroethylene membrane with number A4~A6 respectively show higher melting peaks at temperature around 340 to 345° C., which are corresponding to the original thermal characteristics of the raw polytetrafluoroethylene resin. The porous polytetrafluoroethylene membrane with number A1~A3 respectively show single melting peak form or double melting peaks form at temperature around 320 to 338° C., which are corresponding to characteristics of the porous polytetrafluoroethylene membrane after thermal setting process.

The porous polytetrafluoroethylene membrane with the number A4~A6 present the characteristics of the raw materials having higher melting peaks. On the contrary, the melting peaks corresponding to the raw material in the temperature ranging from 340 to 345° C. are significantly reduced in the porous polytetrafluoroethylene membrane with the number A1~A3 after thermal setting process.

Figure 3:
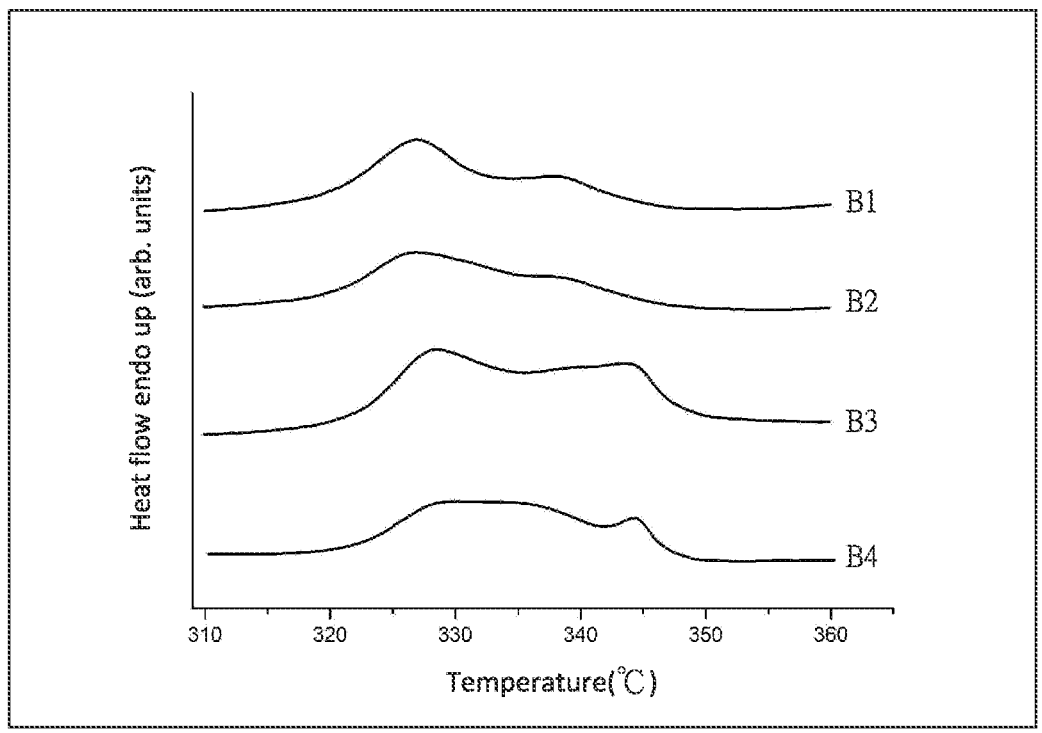
FIG. 3 is a comparison diagram of at least one other embodiment with the porous polytetrafluoroethylene membrane.

With reference to FIG. 3, a comparison diagram with the porous polytetrafluoroethylene membrane B1~B2 formed by the thermal setting process provided by the present invention and the porous polytetrafluoroethylene membrane B3~B4 formed from the other thermal setting process being tested by a differential scanning calorimetry is shown. The porous polytetrafluoroethylene membrane B3~B4 respectively show higher melting peaks corresponding to the raw material in the temperature ranging from 340 to 345° C., and the porous polytetrafluoroethylene membrane B1~B2 respectively show single melting peak form or double melting peaks form at temperature around 320 to 338° C., which are corresponding to characteristics of the porous polytetrafluoroethylene membrane after thermal setting process.

The porous polytetrafluoroethylene membrane B3~B4 respectively present the characteristics of the raw materials that having higher melting peaks comparing to the porous polytetrafluoroethylene membrane B1~B2, which can significantly show better thermal setting characteristics of the porous polytetrafluoroethylene membrane formed by the thermal setting process provided by the present invention presents.

In the result the present invention provides a porous polytetrafluoroethylene membrane, thermosetting method, and equipment thereof, which combine the technology of the heat flow and the thermal radiation that can sure every single portion of the porous polytetrafluoroethylene membrane may be received a same heating temperature that stabilizing the boundary temperature of porous polytetrafluoroethylene membrane, reducing the shrinkage rate of the porous polytetrafluoroethylene membrane to 3% or less, and controlling the quality of the porous polytetrafluoroethylene membrane after the thermal setting effectively.

What is claimed is:

1. A thermosetting method of producing a porous polytetrafluoroethylene membrane comprising steps of:
    1) preparing a porous polytetrafluoroethylene membrane in a heat circulating environment;
    2) providing the porous polytetrafluoroethylene membrane, in the heat circulating environment, with a heat flow with a temperature between 250-400 degrees Celsius to thermal set the porous polytetrafluoroethylene membrane; and
    3) providing a heating enhancement energy source to the porous polytetrafluoroethylene membrane in accordance with the heat flow, wherein a far-infrared radiation heating enhancement energy source is emitted by a far-infrared material being placed in the heat circulating environment to induce far-infrared radiation by the heat flow.

2. The thermosetting method of producing a porous polytetrafluoroethylene membrane as claimed in claim 1, wherein of the heat flow has a speed between 0.6-1.2 meters per minute, and the far-infrared radiation heating enhancement energy source can release a far-infrared radiation with a wavelength between 4-9 micrometers (μm).

3. The thermosetting method of producing a porous polytetrafluoroethylene membrane as claimed in claim 2, wherein the heat flow is perpendicular to one side of the porous polytetrafluoroethylene membrane.

4. A thermosetting method of producing a porous polytetrafluoroethylene membrane comprises steps of:
    1) Preparing a polytetrafluoroethylene mixture, wherein a size screened polytetrafluoroethylene powder is used to mix with a lubricant and form the polytetrafluoroethylene mixture as polytetrafluoroethylene beads;
    2) Using the polytetrafluoroethylene beads to extrude the polytetrafluoroethylene mixture as a sheet with an extruding pressure between 23-30 megapascals (MPa) and a temperature between 40-70 degrees Celsius;
    3) forming the sheet to a slice with thickness between 0.1-0.6 millimeters, removing the lubricant in the mixture at a temperature between 150-250 degrees Celsius, and using a biaxial stretching process to extend the slice at a temperature between 200-300 degrees Celsius, where the slice becomes the porous polytetrafluoroethylene membrane with a thickness between 10-80 micrometers (μm);
    4) Preparing the porous polytetrafluoroethylene membrane in a heat circulating environment; providing the porous polytetrafluoroethylene membrane a heat flow with a temperature between 250-400 degrees Celsius to thermal set the porous polytetrafluoroethylene membrane; and
    5) Providing a heating enhancement energy source to the porous polytetrafluoroethylene membrane in accordance with the heat flow, wherein a far-infrared radiation heating enhancement energy source is emitted by a far-infrared material being placed in the heat circulating environment to induce a far-infrared radiation by the heat flow.

5. The thermosetting method of producing a porous polytetrafluoroethylene membrane as claimed in claim 4, wherein of the heat flow has a speed between 0.6-1.2 meters per minute and a shrinkage rate of the porous polytetrafluoroethylene membrane is 3% or less.

6. The thermosetting method of producing a porous polytetrafluoroethylene membrane as claimed in claim 5, wherein the porous polytetrafluoroethylene membrane has a porosity between 70%-90%, a pore size ranging from 100-450 nanometers (nm), and a thickness between 10-80 micrometers (μm).

7. The thermosetting method of producing a porous polytetrafluoroethylene membrane as claimed in claim 6, wherein the heat flow is perpendicular to one side of the porous polytetrafluoroethylene membrane.

8. A porous polytetrafluroethylane membrane made from the thermosetting method as claimed in claim 1 and further comprising
    a shrinkrage rate of 3% or less;
    a porosity of the pores between 70%-90%;
    a pore size ranging from 100-450 nanometers (nm), and
    a thickness between 10-80 micrometers (μm).

* * * * *